(No Model.)
2 Sheets—Sheet 1.
E. P. WAGGONER.
RETURN STEAM TRAP.
No. 576,488. Patented Feb. 2, 1897.
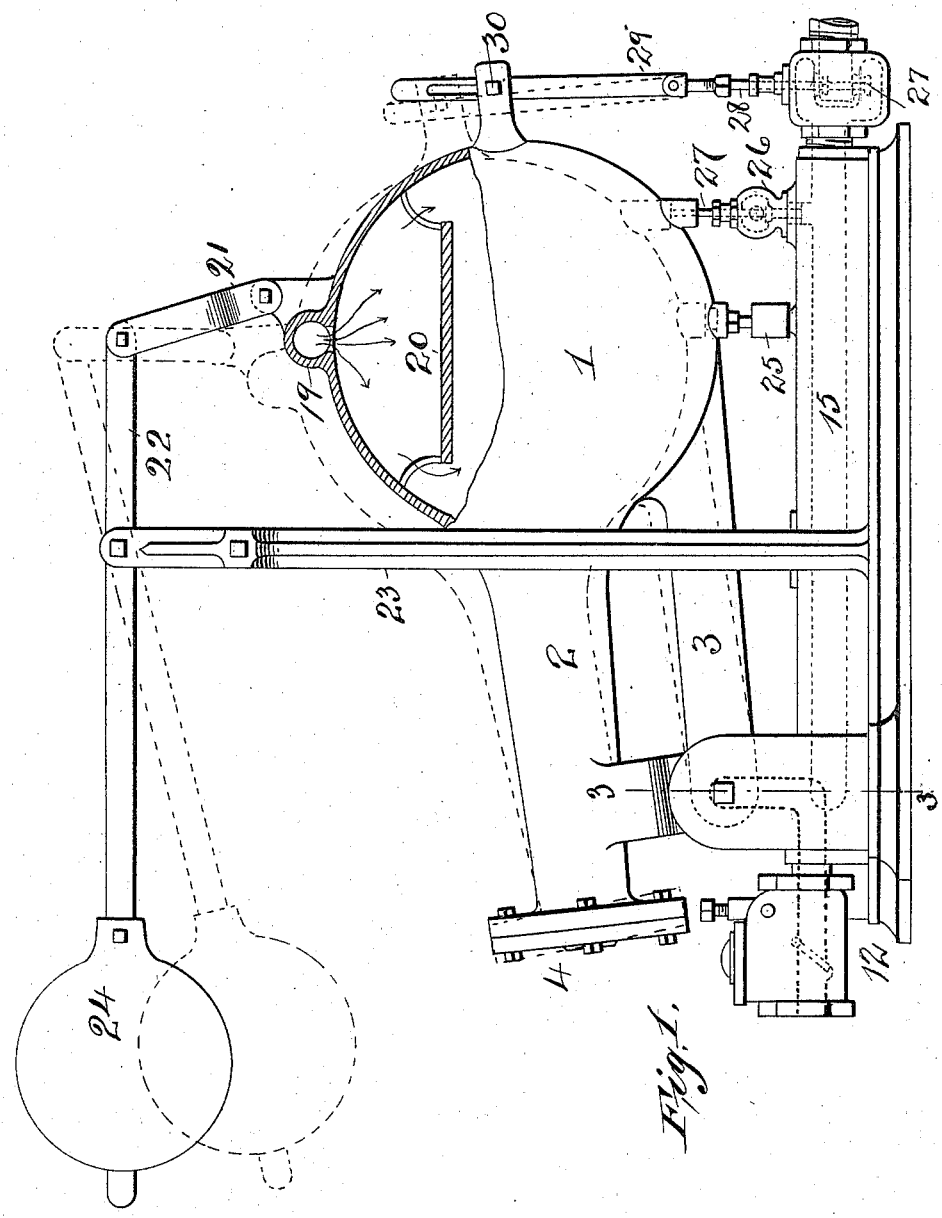
WITNESS:
INVENTOR
Edward P. Waggoner
BY
ATTORNEY (No Model.)　　　　　　　　　　　　　　　　2 Sheets—Sheet 2.
E. P. WAGGONER.
RETURN STEAM TRAP.
No. 576,488.　　　　　　　　　　　Patented Feb. 2, 1897.
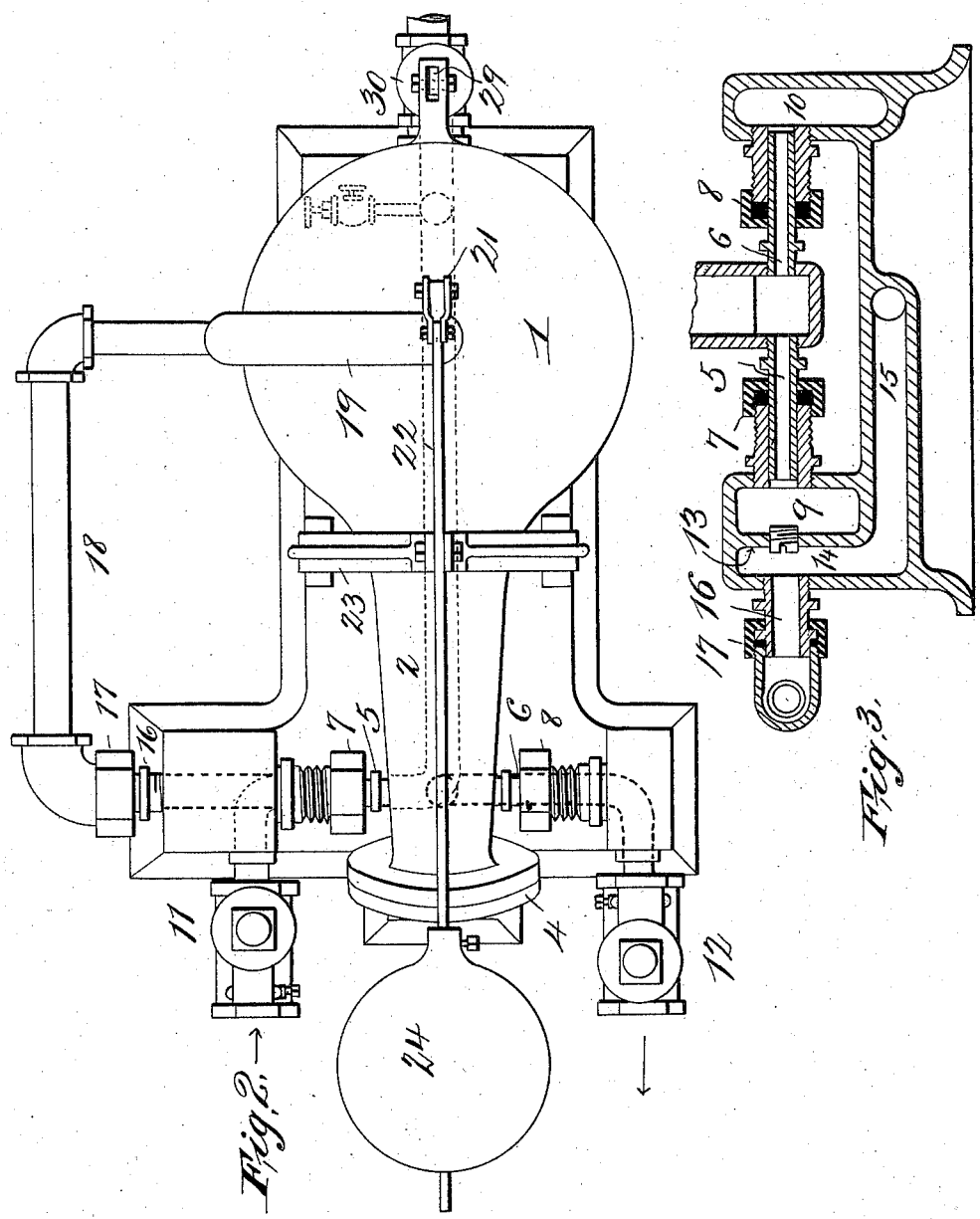
WITNESS:
INVENTOR
Edward P. Waggoner
BY
Livingston Emery
ATTORNEY

UNITED STATES PATENT OFFICE.

EDWARD P. WAGGONER, OF SYRACUSE, NEW YORK, ASSIGNOR TO THE A. A. GRIFFING IRON COMPANY, OF JERSEY CITY, NEW JERSEY.

RETURN STEAM-TRAP.

SPECIFICATION forming part of Letters Patent No. 576,488, dated February 2, 1897.

Application filed September 17, 1896. Serial No. 606,119. (No model.)

*To all whom it may concern:*

Be it known that I, EDWARD P. WAGGONER, a citizen of the United States, residing in Syracuse, in the county of Onondaga and State of New York, have invented certain new and useful Improvements in Return Steam-Traps, the function of which is to free steam-pipes from the water of condensation and return such water to the steam-boiler, of which the following is a specification.

My invention consists in certain novel details of construction and in novel combination of parts hereinafter set forth.

Referring to the drawings, Figure 1 represents a side elevation of my apparatus with the bulb of the receiving-chamber in section; Fig. 2, a plan view of the same, and Fig. 3 a section through the trunnions in the plane of the line 3 3 of Fig. 1.

1 represents the receiving-chamber, which is preferably constructed with two branches 2 and 3, suitably connected together. To the branch 3, at its outer end, is attached a cap 4, that may be removed for the purpose of cleaning out the receiving-chamber. The branch 3 is adapted to be pivoted to the hollow trunnions 5 6, through which the water of condensation enters and leaves the receiving-chamber. The said trunnions enter suitable stuffing-boxes 7 8 and penetrate chambers 9 10, which are preferably cast integral with the base-plate and are severally directly connected with the inlet-valve 11 and the outlet-valve 12. The chamber 9 is preferably constructed larger than the chamber 10 and provided with a partition 13, forming two compartments 9 14, the compartment 9 being directly connected with the inlet-valve 11, as heretofore set forth, and the compartment 14 being directly connected with the steam-supply pipe 15, which is preferably cast integral with the base. To the outside of the compartment 14, and preferably alined with the axis of the receiving-chamber, is suitably secured a hollow trunnion 16, which enters a suitable stuffing-box 17, and in turn is directly connected with the pipe 18, oscillating in unison with the receiving-chamber. The receiving-chamber is provided with an exterior pipe 19, preferably cast integral therewith and preferably in the same plane as the lower branch 2 of the receiving-chamber. This pipe 19 extends upward and enters the top of the bulb of the receiving-chamber. Within the bulb of the receiving-chamber and preferably cast integral therewith is a deflector or spreader 20, the function of which is to distribute the live steam within the receiving-chamber and secure the better evacuation thereof. At a suitable point on the bulb of the receiver and pivotally attached thereto is a link 21, which in turn is pivotally attached to the lever-arm 22, suitably supported in a projection 23 of the base. To one end of the said lever is attached a weight 24, sufficient to compensate the weight of the receiving-chamber and force it into its uppermost position, as shown in dotted lines, Fig. 1. The base of the apparatus is provided with a stop 25, upon which the receiver rests when in its lowest position or when filled with the water of condensation. The base is also provided with a live-steam inlet 15, preferably cast integral therewith. This inlet is provided with an exhaust 26 and valve-stem extension 3, which is operated by the oscillation of the receiving-chamber. To the steam-inlet 15 a valve 27 is attached and connected with the live steam of the boiler. This valve is operated by an arm 29, provided with a pin moving in a slot in an extension 28 of the stem of the valve 27. Although the said slot is quite long, it is so arranged that the oscillation of the receiving-chamber will only open and close the valve when it reaches its extremes of oscillation.

Having now described the various mechanical details of my invention, I will describe its operation, referring to Fig. 1. When the receiving-chamber and other operative parts of the device are in the position shown, the said chamber is full of the water of condensation and the live steam about to enter or entering the valve 27. As this steam enters through the inlet 15 it passes into the chamber 14, then through the hollow trunnion 16, through the pipes 18 and 19, into the upper portion of the bulb of the receiving-chamber. It is there distributed by the deflector 20, and the water of condensation in the receiving-chamber is forced, or, by balancing the pressures, allowed to flow through the lower branch of the said chamber through the hollow trunnion 16 into the enlarged chamber 10, and thence to the boiler through the return-valve 12. As the chamber begins to lighten itself by the evacuation of the steam the weight 24 at the end of the lever-arm 22 begins to raise the receiving-chamber into its uppermost position, as shown in dotted lines, and the arm 29 begins to close the live-steam-inlet valve 27. To permit the water from the returns to promptly enter the receiving-chamber 1, an exhaust-valve 26 is provided in the live-steam-inlet pipe 15, which valve is operated by the weight of the receiving-chamber to close the said exhaust when the inlet-steam is entering, and the pressure of the said steam within the various parts of the apparatus is sufficient to open the same as soon as the supply of live steam is shut off.

The principle upon which this apparatus works is that the pressure in the steam-heating system will be sufficient to force the water of condensation through the inlet-valve of the device and into the receiving-chamber, and as the pressure in the chamber has been reduced by the exhaust-valve said chamber sinks by the weight of the water of condensation. The live steam flows in equalizing the pressure in the receiving-chamber and the boiler, thereby allowing the water of condensation to flow by gravity into the boiler.

Having now described my invention, what I claim, and desire to secure by Letters Patent, is—

1. In a steam-trap, a suitably-supported receiving-chamber oscillating upon and communicating with hollow trunnions and communicating with the water inlet and outlet, an exterior live-steam supply oscillating in unison with the said receiving-chamber and connecting and communicating with an oscillating extension oscillating in alinement with the said trunnions, but having no communication therewith.

2. In a steam-trap, a receiving-chamber provided with a deflector for the distribution of live steam and oscillating upon hollow trunnions connecting with the water inlet and outlet, an exterior steam-supply pipe oscillating in unison with said chamber and not communicating with said trunnions.

3. In a steam-trap the combination of a receiver oscillating upon and communicating with hollow trunnions with a base provided with a suitable support for said receiver, a steam-inlet provided with a valve operated by the oscillating of said receiver, an exhaust in said base communicating with the steam-supply pipe, a chamber in two portions, one communicating with the steam-supply and one with the water-supply, a water-outlet, said water-supply chamber and water-outlet being in direct communication with said receiver and an exterior oscillating pipe conveying live steam to said receiver for evacuating the same.

EDWARD P. WAGGONER.

Witnesses:
J. M. C. THOMAS,
S. E. BRYNER.